May 10, 1927.
L. M. CREWS
SKIDDING PREVENTING DEVICE
Filed Aug. 20, 1925
1,627,768
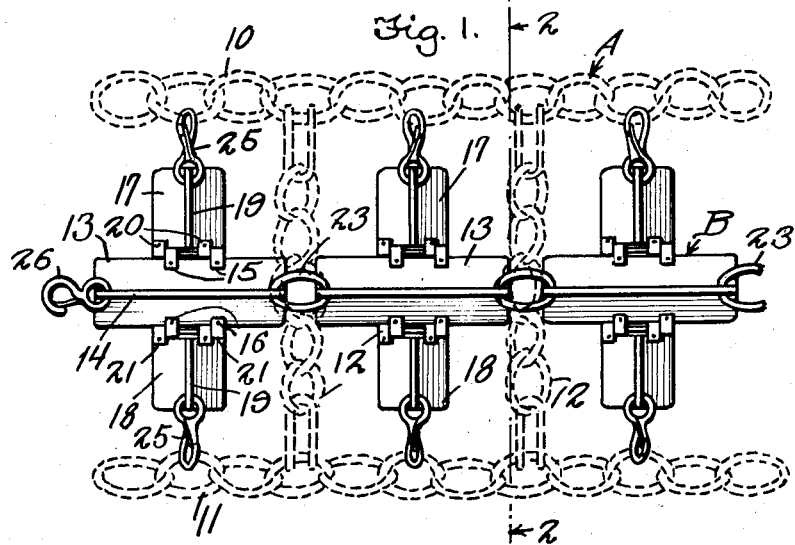
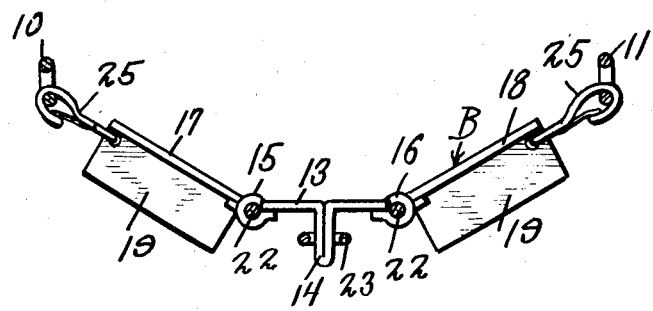
Lucenius M. Crews,
Inventor
Witnesses
By Richard B. Owen
Attorney Patented May 10, 1927.

1,627,768

UNITED STATES PATENT OFFICE.

LUCENIUS MARION CREWS, OF FAIRBURN, SOUTH DAKOTA.

SKIDDING-PREVENTING DEVICE.

Application filed August 20, 1925. Serial No. 51,417.

This invention appertains broadly to new and useful improvements in appliances for motor vehicles and has more specific reference to a novel and simplified anti-skid device for attachment to the wheels thereof.

The primary object of the present invention is the provision of such an anti-skid device particularly adapted in case of emergencies for association with the customary anti-skid chain of the Weed type when it is essential that greater pulling qualities be had than the ordinary chain of the Weed type affords.

Another object of the present invention is the provision of new and novel means whereby the present improved anti-skid device may be quickly and easily secured to or detached from the ordinary anti-skid chain of the Weed type.

Another object of the present invention is to provide an anti-skid device which will not only serve to effectively prevent the skidding of the vehicle but which may be also utilized to assist in the guiding thereof.

A further object of the present invention is to provide such an anti-skid device of the nature stated having a plurality of longitudinally extending plates provided with longitudinally extending ribs and a plurality of transversely extending plates provided with transversely extending ribs, together with means carried by said ribs, for connecting said plates together.

A still further object of the present invention is the provision of such an anti-skid device which is durable and efficient in use, one which can be manufactured and placed on the market at a reasonable figure, and one which can be used in association with the ordinary anti-skid chains of the Weed type.

With these and numerous other objects in view, the invention resides in the novel construction, combination and formation of parts as will be more fully hereinafter described, illustrated in the accompanying drawings and particularly pointed out in the appended claims.

In the drawings forming a part of this application:

Figure 1 is a top plan view of a section of an anti-skid chain of the Weed type showing associated therewith an anti-skid attachment constructed in accordance with the present invention.

Figure 2 is a transverse sectional view taken on line 2—2 of Figure 1.

Reference now being had more particularly to the accompanying drawings wherein for the purpose of illustration has been disclosed a preferred embodiment of the present invention, the letter A generally indicates an ordinary anti-skid chain of the Weed type and B the present improved anti-skid attachment associated therewith.

The anti-skid chain A includes the longitudinally extending side chains 10 and 11 and the transversely connecting chains 12 which extend transversely across the tread of the tire when the chain is in position thereon.

The anti-skid attachment B embodies essentially a plurality of elongated longitudinally extending plates 13, the under surface of each of said plates being flat to provide a rest for the tire while the outer surface thereof is provided intermediate its longitudinal edges with the longitudinally extending rib 14. The opposite longitudinal edges of each of said plates 13 is provided intermediate its ends with the hinge sections 15 and 16.

A pair of transverse plates 17 and 18 are associated with each of said longitudinally extending plates 13, each of said transverse plates being provided on its outer surface with the transversely extending rib 19, while the under surface thereof is flat to also provide a rest for the tire. The inner ends of said transverse plates 17 and 18 are provided with hinge sections 20 and 21 respectively adapted to aline with the hinge sections 15 and 16 formed on the longitudinally extending plate 13. Pivot pins 22 are passed through the said alined hinge sections whereby a pivotal connection is provided between the transverse plates and the longitudinally extending plate.

The intermediate longitudinally extending plates are secured together by means of ordinary links 23 carried by the adjacent ends of the longitudinally extending ribs 14 while carried by the outer ends of the transverse ribs 19 of the transverse plates 17 and 18 are snap fasteners 25 which are detachably engaged with the side chains 10 and 11. It will be understood that a sufficient number of longitudinally extending plates 13 are provided to entirely encircle the tire and one of the end plates is adapted to carry a suitable snap fastener 26 which is to be detachably engaged with the other end plate whereby to secure the opposite ends of the anti-skid device together.

When the device is placed upon a tire, the free ends thereof are first secured together in the manner above stated by engaging the snap fastener 26 with the opposite end plate 13 after which the chain A is applied thereover and it will be noted that when so positioned, the transverse chains 12 serve to hold the device in position against the tire. The snap fasteners 25 are then engaged with the side chains 10 and 11 whereupon the device is ready for use. To remove the device from the tire, the above operations are simply reversed. The novel hinge connection between the longitudinal and transverse plates enables the same to conform to tires of different sizes and shapes upon which the device may be used.

Under special circumstances, it may be found desirable to also secure the present device to the front tires of a motor vehicle to assist in the driving thereof. When this is done, the plurality of longitudinally extending ribs 13 form an annular rib around the tire and it can be readily appreciated that this will greatly assist in the guiding of the vehicle. Of course, the transverse ribs 19 could be omitted should it be desired to use the device primarily for assisting in the guiding of the vehicle.

While there has been disclosed a preferred embodiment of the present invention, it is to be understood that changes in the details of construction thereof may be resorted to without departing from or sacrificing the spirit of the invention so long as such changes fall within the scope of the appended claims.

I claim:

1. The combination with an anti-skid chain for the wheels of motor vehicles including side chains, and transverse connecting chains, of an anti-skid attachment therefor including a plurality of elongated plates provided with ribs extending circumferentially of the wheel, means carried by said ribs for securing said plates together, a plurality of plates hingedly connected to the longitudinal edges of the first named plates and provided with ribs extending transversely of the wheel, and means carried by said transverse ribs and adapted for detachable engagement with said side chains for securing the device thereto.

2. The combination with an anti-skin chain for the wheels of motor vehicles including side chains, and transverse connecting chains, of an anti-skid attachment therefore including a plurality of elongated plates provided with ribs extending the entire length thereof and circumferentially of the wheel, links carried by said ribs for securing said plates together, a plurality of plates hingedly connected to the longitudinal edges of the first named plates intermediate their ends and provided with ribs extending the entire length thereof and transversely of the wheel, and fastening elements carried by said transverse ribs and adapted for detachable engagement with the said side chains for securing the device thereto.

3. The combination with an anti-skid chain for the wheels of motor vehicles including tire chains and transverse chains, of an anti-skid attachment therefor including a plurality of elongated plates provided with ribs extending circumferentially of the wheel, means for connecting said plates together, a plurality of side plates connected to the longitudinal edges of the first named plates, and provided with ribs extending transversely of the wheel, and means carried by the side plates for connection with the side chains for securing the device thereto.

L. MARION CREWS.